(12) United States Patent
McIntosh

(10) Patent No.: US 11,066,823 B2
(45) Date of Patent: *Jul. 20, 2021

(54) WATERLESS URINAL AND WATERLESS URINAL CARTRIDGE THEREFOR

(71) Applicant: The Boeing Company, Chicago, IL (US)

(72) Inventor: Darren C. McIntosh, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 27 days.

This patent is subject to a terminal disclaimer.

(21) Appl. No.: 16/577,009

(22) Filed: Sep. 20, 2019

(65) Prior Publication Data

US 2020/0011044 A1 Jan. 9, 2020

Related U.S. Application Data

(63) Continuation of application No. 15/702,948, filed on Sep. 13, 2017, now Pat. No. 10,458,109.

(51) Int. Cl.
*E03D 13/00* (2006.01)
*A47K 11/12* (2006.01)
(Continued)

(52) U.S. Cl.
CPC ............ *E03D 13/007* (2013.01); *A47K 11/12* (2013.01); *B64D 11/02* (2013.01); *E03C 1/281* (2013.01);
(Continued)

(58) Field of Classification Search
CPC ...... A47K 11/12; E03D 13/007; B64D 11/02; B60R 15/04; B61D 35/005
See application file for complete search history.

(56) References Cited

U.S. PATENT DOCUMENTS

| 5,711,037 A | 1/1998 | Reichardt et al. |
| 6,053,197 A | 4/2000 | Gorges |

(Continued)

FOREIGN PATENT DOCUMENTS

KR 20130005992 1/2013

OTHER PUBLICATIONS

Waterless Co., Inc. "No Water/No Flushing Urinals; Water Saving Toilets" htps:www.waterless.com/no-flush-urinals/.

(Continued)

*Primary Examiner* — Janie M Loeppke
(74) *Attorney, Agent, or Firm* — Perman & Green LLP

(57) ABSTRACT

A waterless urinal cartridge, for waterless urinals, includes a housing and a cover. The housing includes a waste reservoir configured to hold a predetermined volume of wastewater, and a drainage aperture configured so that an amount of wastewater exceeding the predetermined volume of wastewater flows through the drainage aperture to exit the housing. The cover is coupled to the housing and includes a sealing fluid reservoir having walls that define the waste reservoir and the drainage aperture, the walls of the sealing fluid reservoir form a containment perimeter with an open bottom so as to contain a sealing fluid floating on top of the predetermined volume of wastewater, and a plurality of fluid passages direct wastewater from the fluid bowl to the sealing fluid reservoir. The waste reservoir includes a fluid flow control feature that restrains wastewater movement within the waste reservoir in response to a change in vehicle dynamics.

20 Claims, 10 Drawing Sheets

(51) Int. Cl.
  *B64D 11/02* (2006.01)
  *E03C 1/29* (2006.01)
  *E03C 1/28* (2006.01)
  *E03C 1/294* (2006.01)
  *E03D 9/10* (2006.01)

(52) U.S. Cl.
  CPC ............... *E03C 1/29* (2013.01); *E03C 1/294* (2013.01); *E03C 1/28* (2013.01); *E03D 9/10* (2013.01)

(56) References Cited

U.S. PATENT DOCUMENTS

| | | | |
|---|---|---|---|
| 8,621,677 B2* | 1/2014 | Seibt | E03F 1/006 4/431 |
| 8,739,320 B1 | 6/2014 | McTaggart | |
| 9,376,211 B2* | 6/2016 | Schliwa | B64D 11/0023 |
| 9,598,174 B2* | 3/2017 | Schliwa | B64D 11/02 |
| 2012/0066822 A1 | 3/2012 | Kueng | |
| 2012/0167296 A1 | 7/2012 | Nomura et al. | |
| 2014/0013498 A1* | 1/2014 | Boodaghians | E03D 13/007 4/301 |
| 2014/0352045 A1 | 12/2014 | Goldsmith | |
| 2014/0352048 A1 | 12/2014 | Nakamura et al. | |

OTHER PUBLICATIONS

Turner, Amiee. "A830 Male Urinals to Become 'Bog Standard'". Https://www.flightglobal.com/news/articles/a380-male-urinals-to-become-bog-standard-222871/.
Falcon Waterfree Technologies. "Products" http://falconwaterfree.com/products/.
Diehl Aerosystems. "Comfort Modules Luxury Bathrooms" http://www.diehl.com/en/diehl-aerosystems/cabin-interiors/comfort-modules/luxury-bathrooms . . . .
Curry, Andrew "Standing Room Only; Are Airplane Urinals About to Take Off?" http://www.spiegel.de/international/business/standing-room-only-are-airplane-urinals-about-to-take-off/.
Cassey, Darren "The Gyro Cup Holder is the Best New Invention We Probably Don't Need" https://www.carthrottle.com/post/the-gyro-cup-holder-is-the-best-new-invention-we-probably-dont-need/.
Extended European Search Report, European Application No. 18190108, dated May 15, 2019.

* cited by examiner

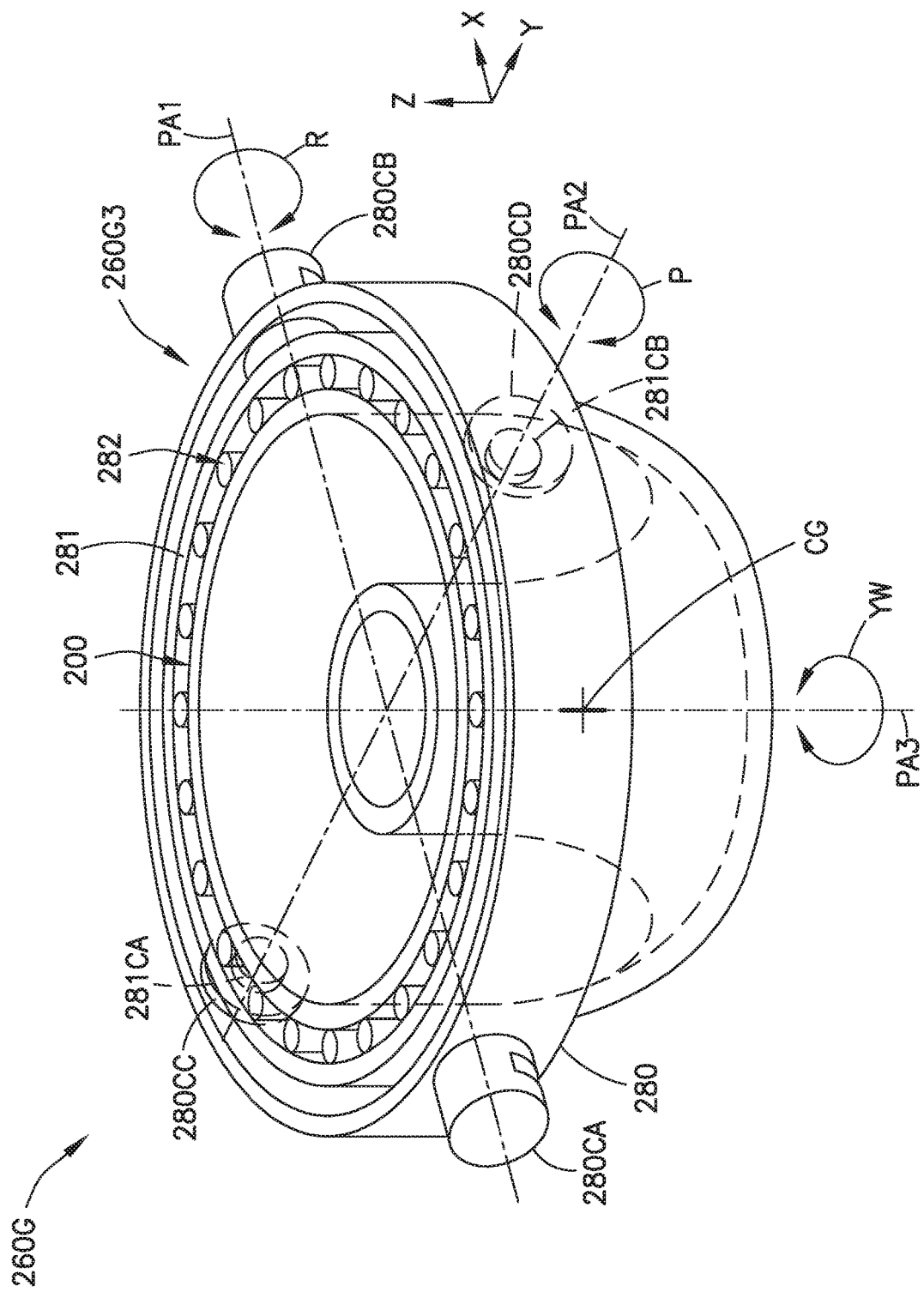

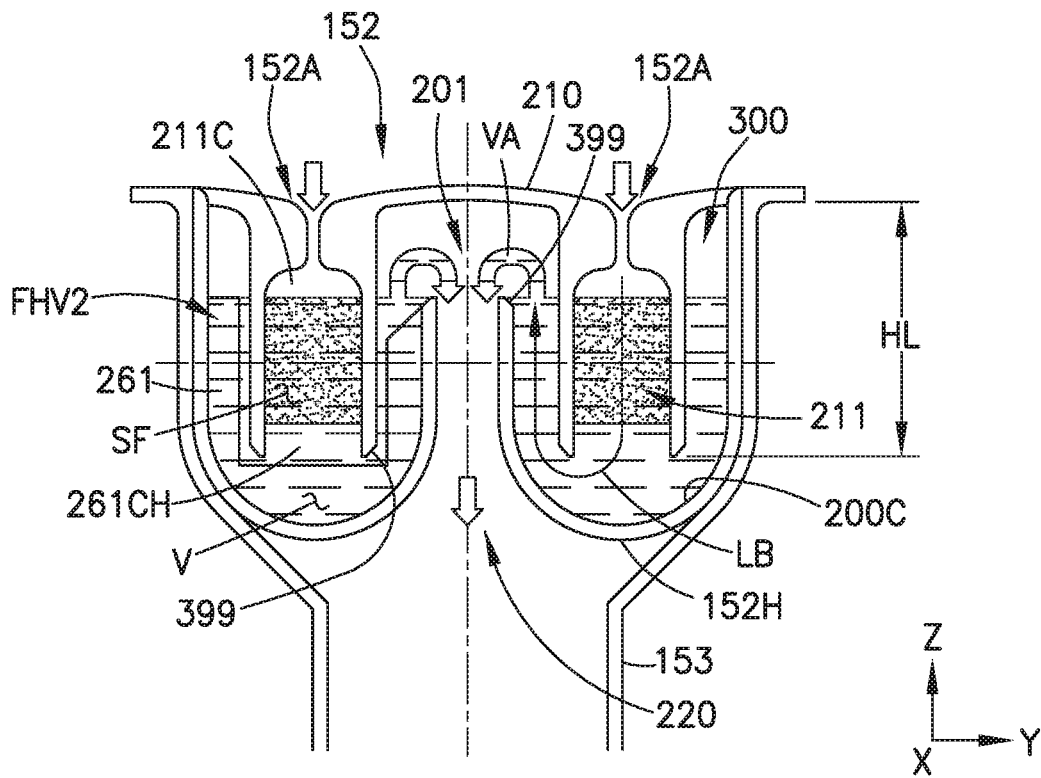
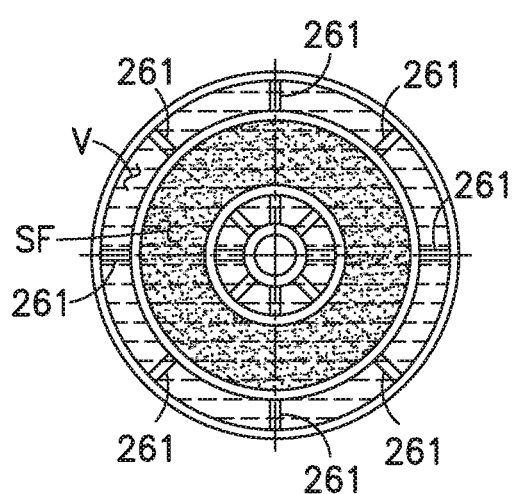 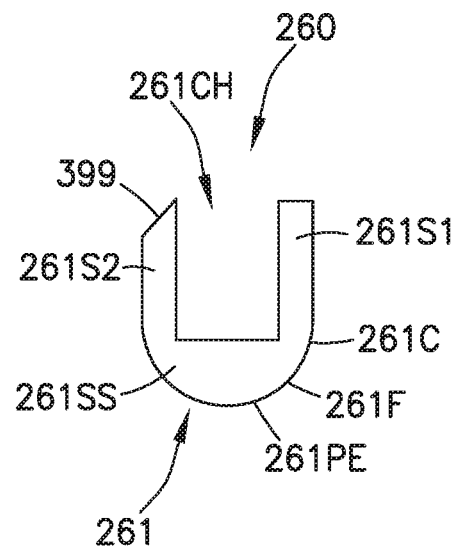
FIG.3A
FIG.3B   FIG.3C

WATERLESS URINAL AND WATERLESS URINAL CARTRIDGE THEREFOR

CROSS-REFERENCE TO RELATED APPLICATIONS

This application is a continuation of and claims the benefit of U.S. patent application Ser. No. 15/702,948 filed on Sep. 13, 2017 (now U.S. Pat. No. 10,458,109), the disclosure of which is incorporated herein by reference in its entirety.

BACKGROUND

1. Field

The aspects of the present disclosure generally relate to transport vehicle lavatories and in particular to transport vehicle urinals.

2. Brief Description of Related Developments

Generally, to provide lavatory services onboard a vehicle (such as e.g., aircraft, trains, maritime vessels, recreational vehicles, etc.), the vehicle carries a water supply that is used for flushing the toilets onboard the aircraft. Once used, the water is contained within a waste water hold of the aircraft. This onboard water supply increases the weight of the vehicle which may lead to increased fuel costs and limited vehicle payload.

Generally, vehicle lavatories are full lavatories. For example, a full lavatory is a lavatory that includes a sink and a toilet. In some instances, these conventional lavatories are modified to include a urinal in addition to the sink and toilet. Where a urinal is included in the conventional lavatory, the urinal is plumbed to the vehicle water supply for flushing. The addition of the urinal also increases the size of the lavatory taking away from valuable passenger cabin space (e.g., a decreased number of passenger seating positions results from the increased lavatory size). Generally, where urinals are included in the conventional vehicle lavatories they are included only in the first class lavatories.

SUMMARY

The following is a non-exhaustive list of examples, which may or may not be claimed, of the subject matter according to the present disclosure.

One example of the subject matter according to the present disclosure relates to a waterless urinal for a vehicle, the waterless urinal comprising: a fluid bowl having a drain; and a waterless urinal cartridge removably disposed within the drain, the waterless urinal cartridge including a housing having a waste reservoir disposed within the housing and being configured to hold a predetermined volume of urine, and a drainage aperture configured so that an amount of urine exceeding the predetermined volume of urine flows through the drainage aperture to exit the housing, and a cover coupled to the housing and forming part of a surface contour of the fluid bowl, the cover including a sealing fluid reservoir and a plurality of fluid passages for directing urine from the fluid bowl to the sealing fluid reservoir, the sealing fluid reservoir being in communication with an internal cavity of the housing, wherein the waste reservoir includes at least one fluid flow control feature configured to restrain urine movement within the waste reservoir in response to a change in vehicle dynamics.

Another example of the subject matter according to the present disclosure relates to a vehicle comprising: a lavatory; and a waterless urinal disposed within the lavatory, the waterless urinal including a fluid bowl having a drain; and a waterless urinal cartridge removably disposed within the drain, the waterless urinal cartridge including a housing having a waste reservoir disposed within the housing and being configured to hold a predetermined volume of urine, and a drainage aperture configured so that an amount of urine exceeding the predetermined volume of urine flows through the drainage aperture to exit the housing, and a cover coupled to the housing and forming part of a surface contour of the fluid bowl, the cover including a sealing fluid reservoir and a plurality of fluid passages for directing urine from the fluid bowl to the sealing fluid reservoir, the sealing fluid reservoir being in communication with an internal cavity of the housing, wherein the waste reservoir includes at least one fluid flow control feature configured to restrain urine movement within waste reservoir in response to a change in vehicle dynamics.

Still another example of the subject matter according to the present disclosure relates to a method for using a urinal within a vehicle, the method comprising: holding a predetermined volume of urine within a waste reservoir of a waterless urinal cartridge disposed in a fluid bowl of the urinal, where urine passes through a drainage aperture of the waste reservoir when an amount of urine exceeds the predetermined volume so that urine exits the waterless urinal cartridge; sealing the urine within the waste reservoir with one or more of a sealing fluid disposed within a sealing fluid reservoir of a cover of the waterless urinal cartridge, and a plurality of fluid passages disposed in the cover, where the plurality of fluid passages direct urine from the fluid bowl to the sealing fluid reservoir and the sealing fluid reservoir is in communication with the waste reservoir; and restraining urine movement within the waste reservoir, with at least one fluid flow control feature of the waste reservoir, in response to a change in vehicle dynamics.

BRIEF DESCRIPTION OF THE DRAWINGS

Figure 1A:
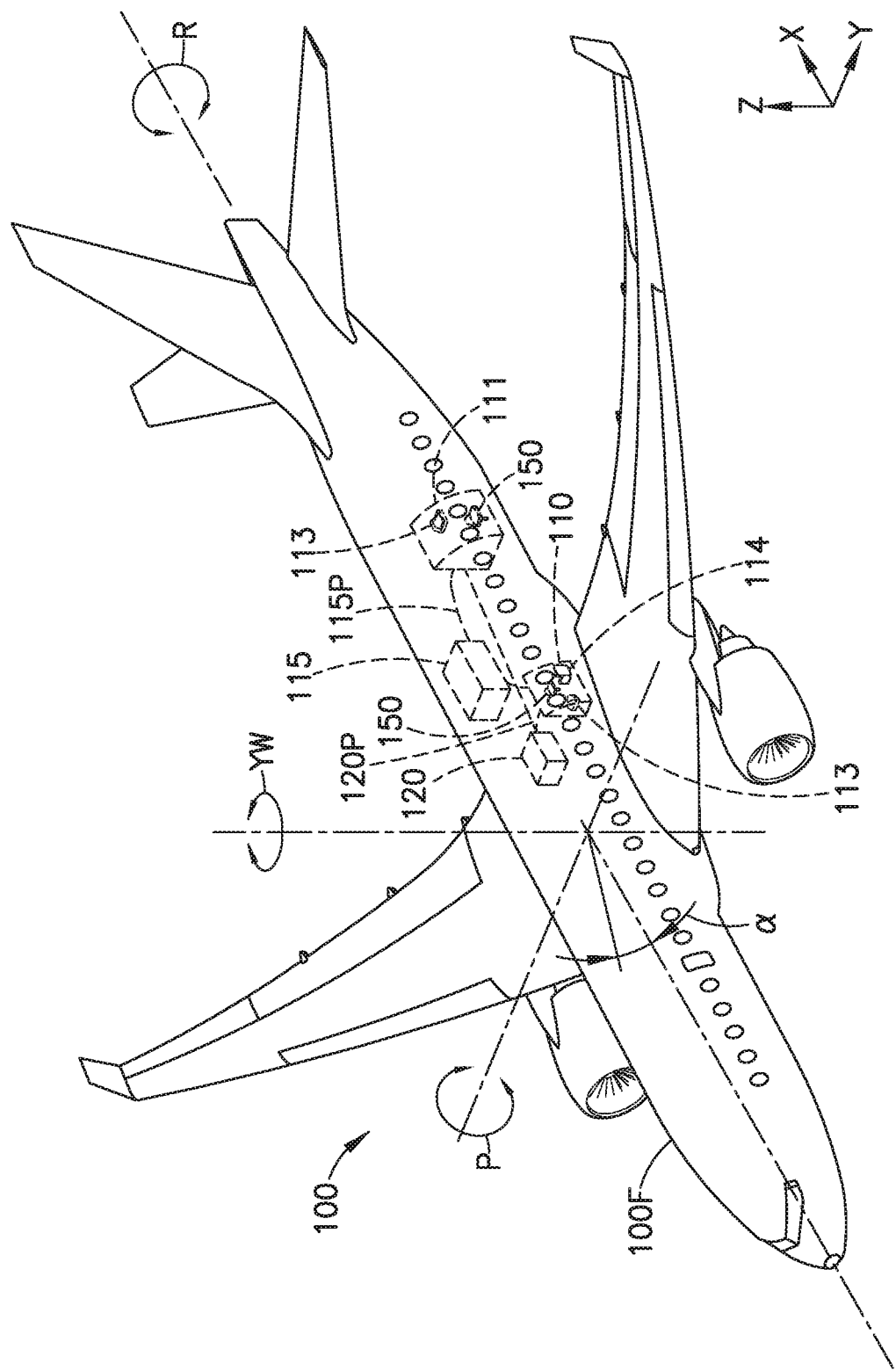
Figure 1B:
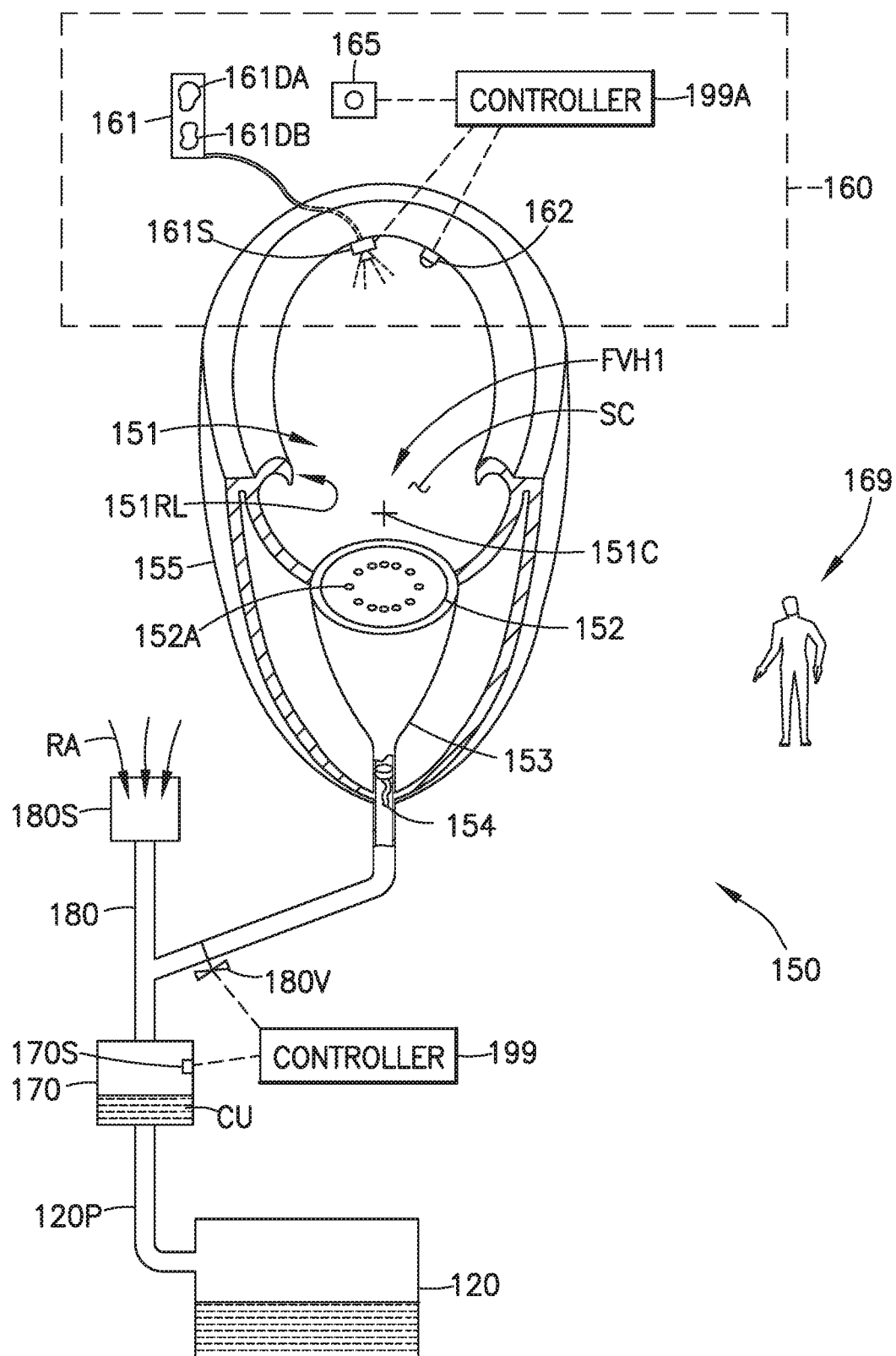
Figure 2A:
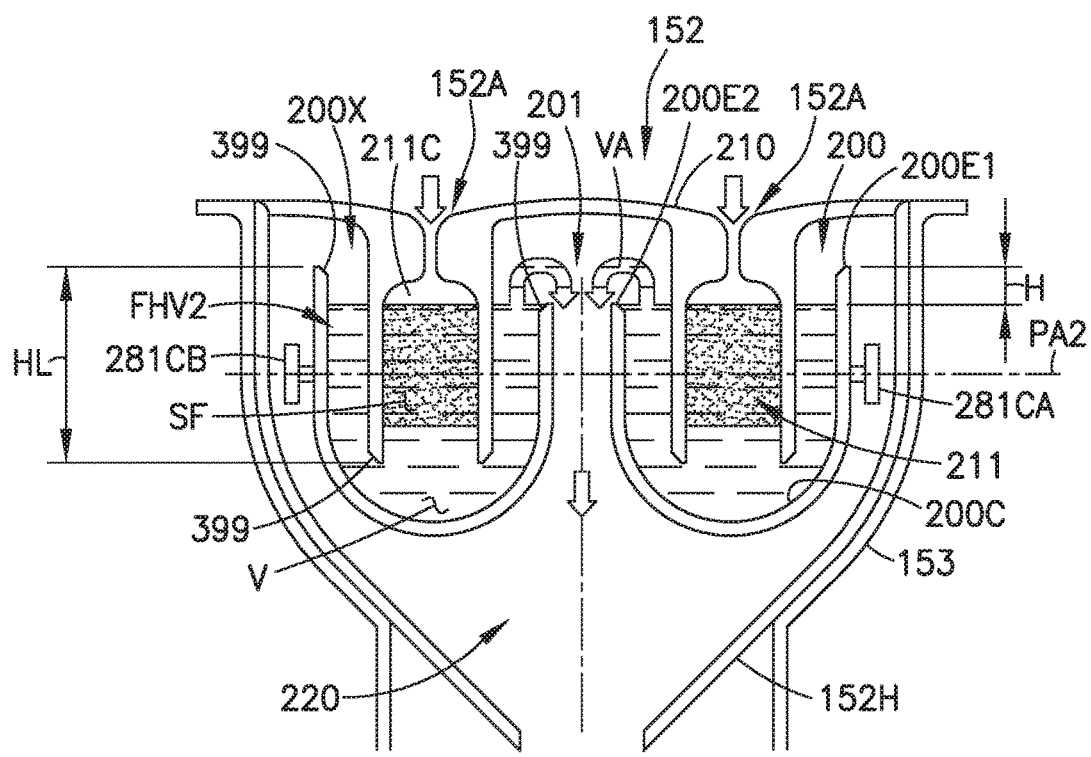
Figure 2B:
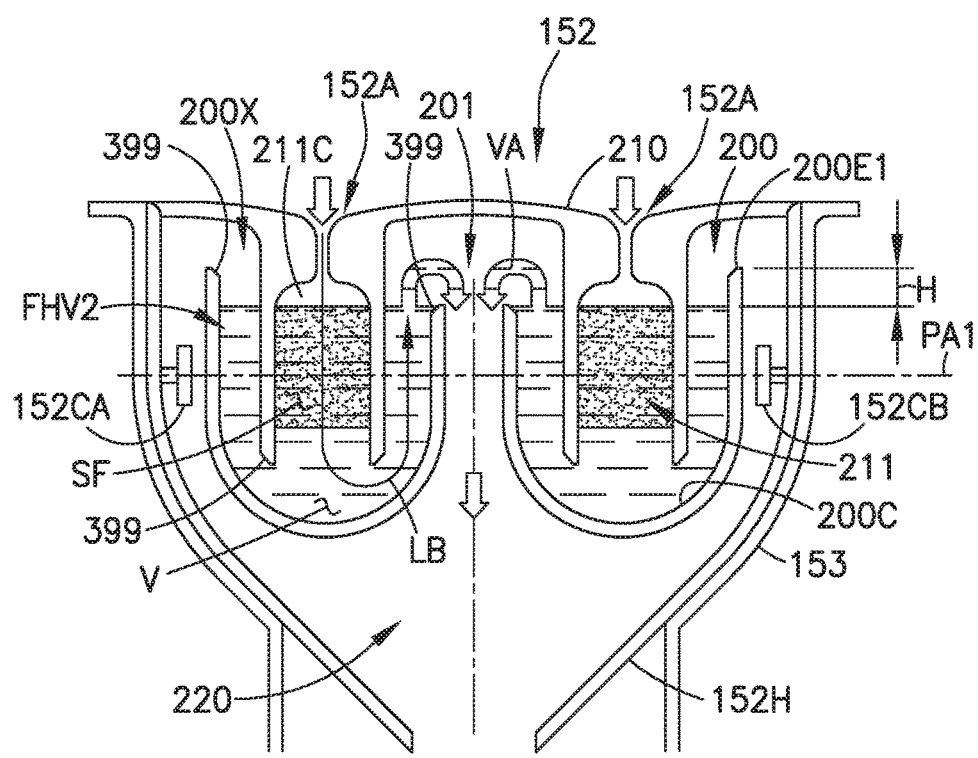
Figure 2C:
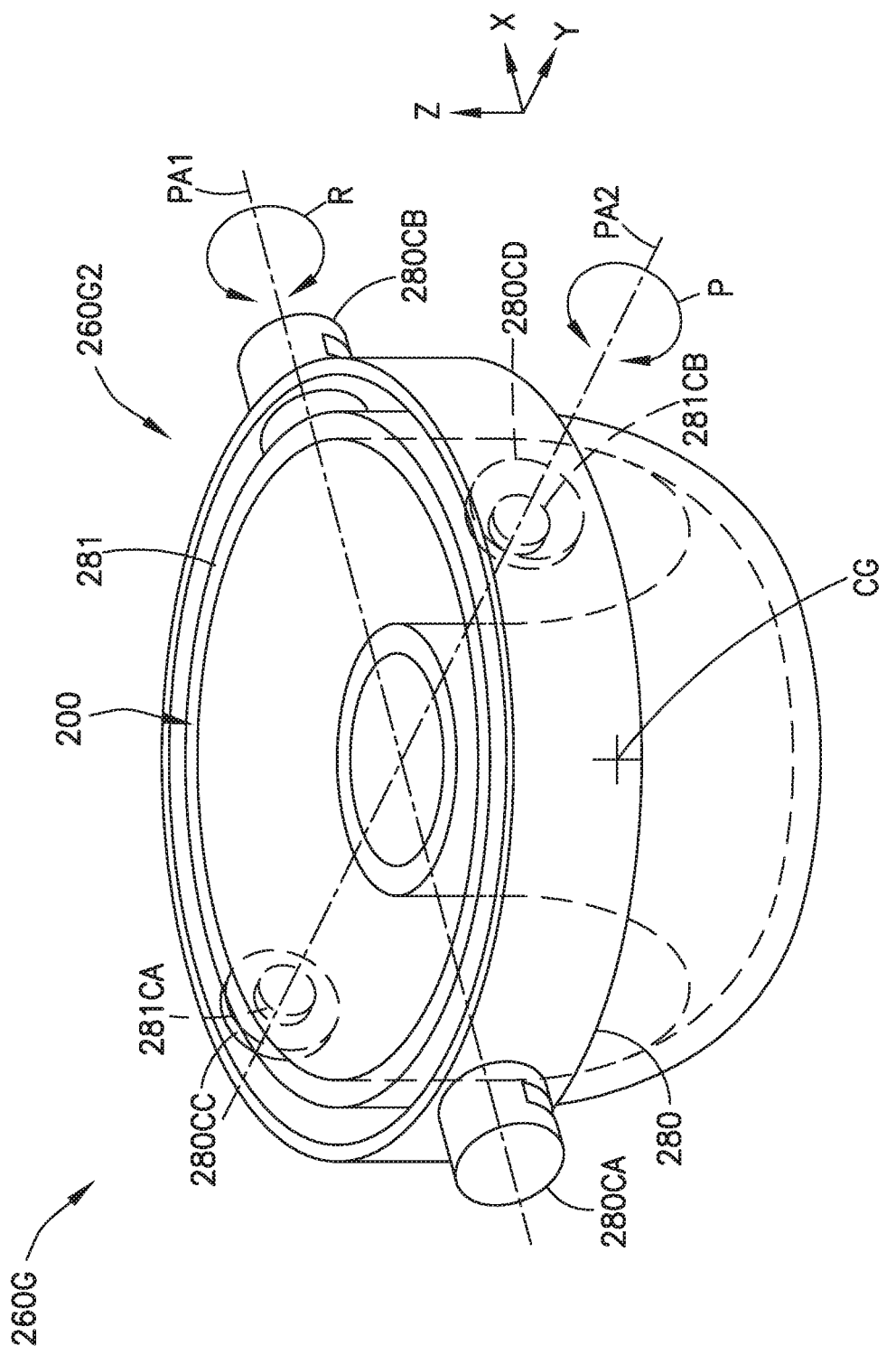
Figure 2E:
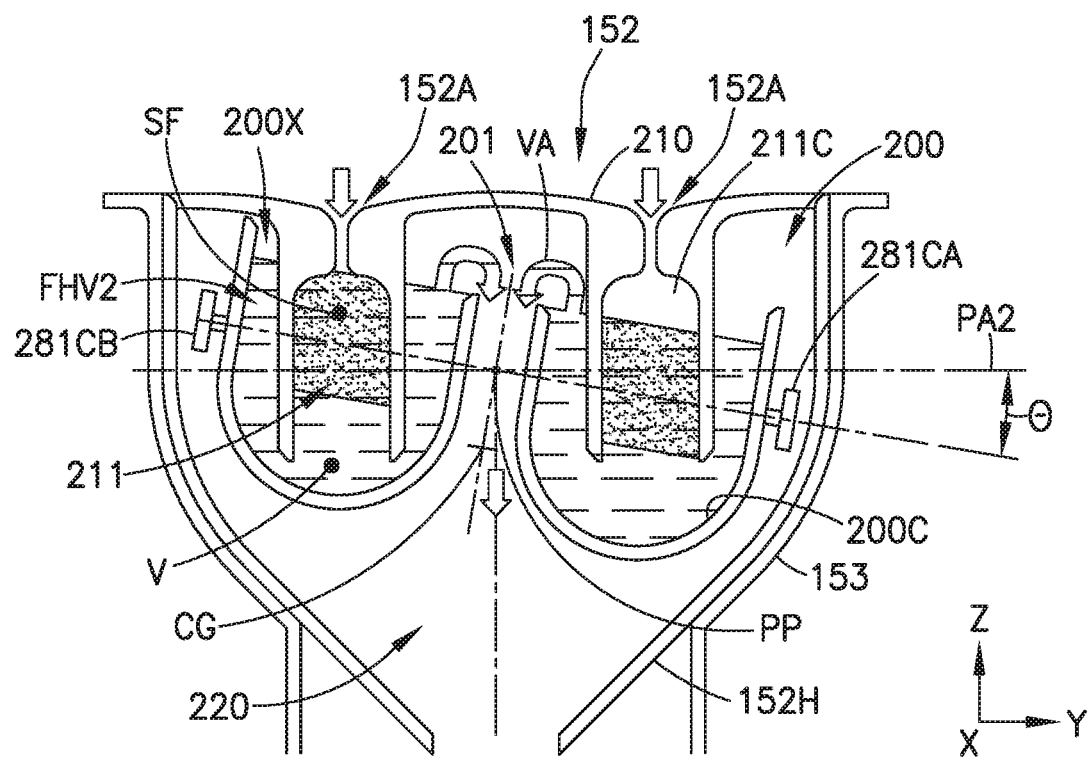
Figure 2F:
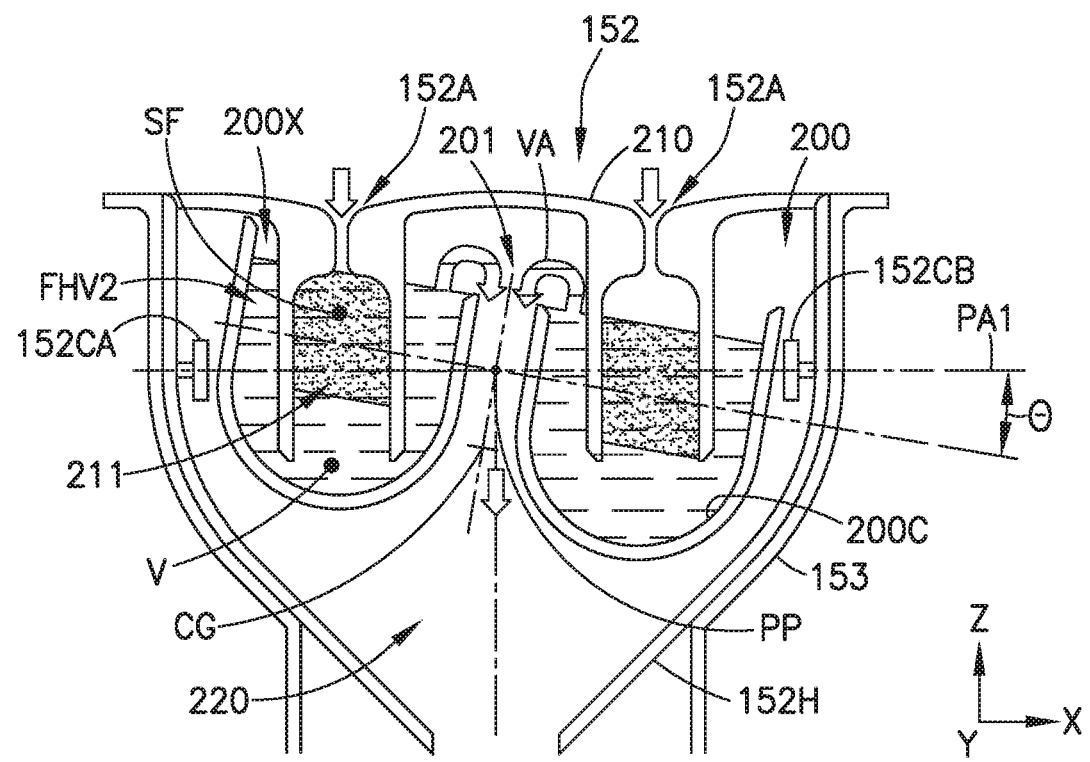
Figure 2H:
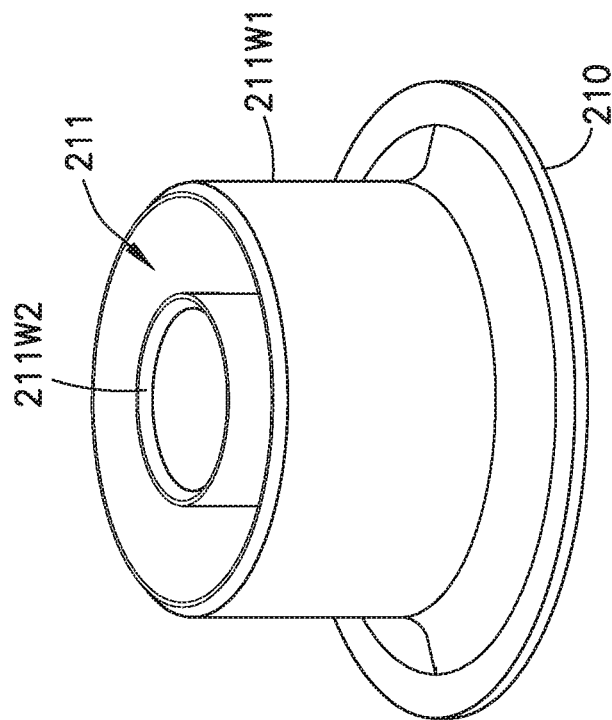
Figure 2G:
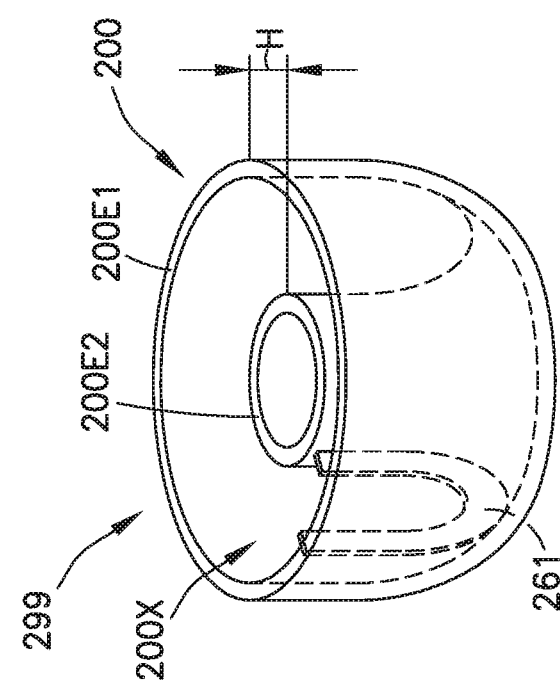
Figure 3D:
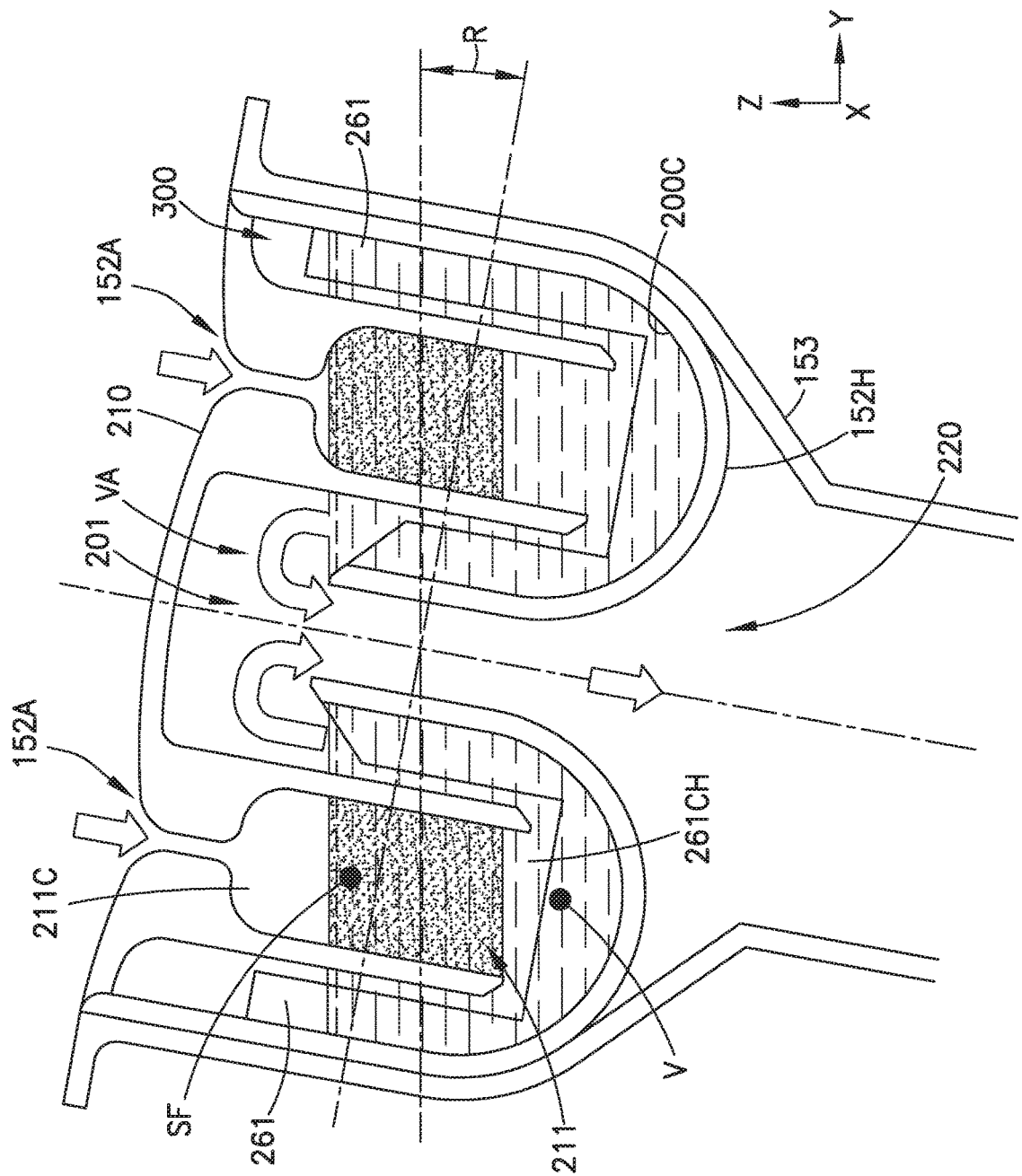
Figure 4:
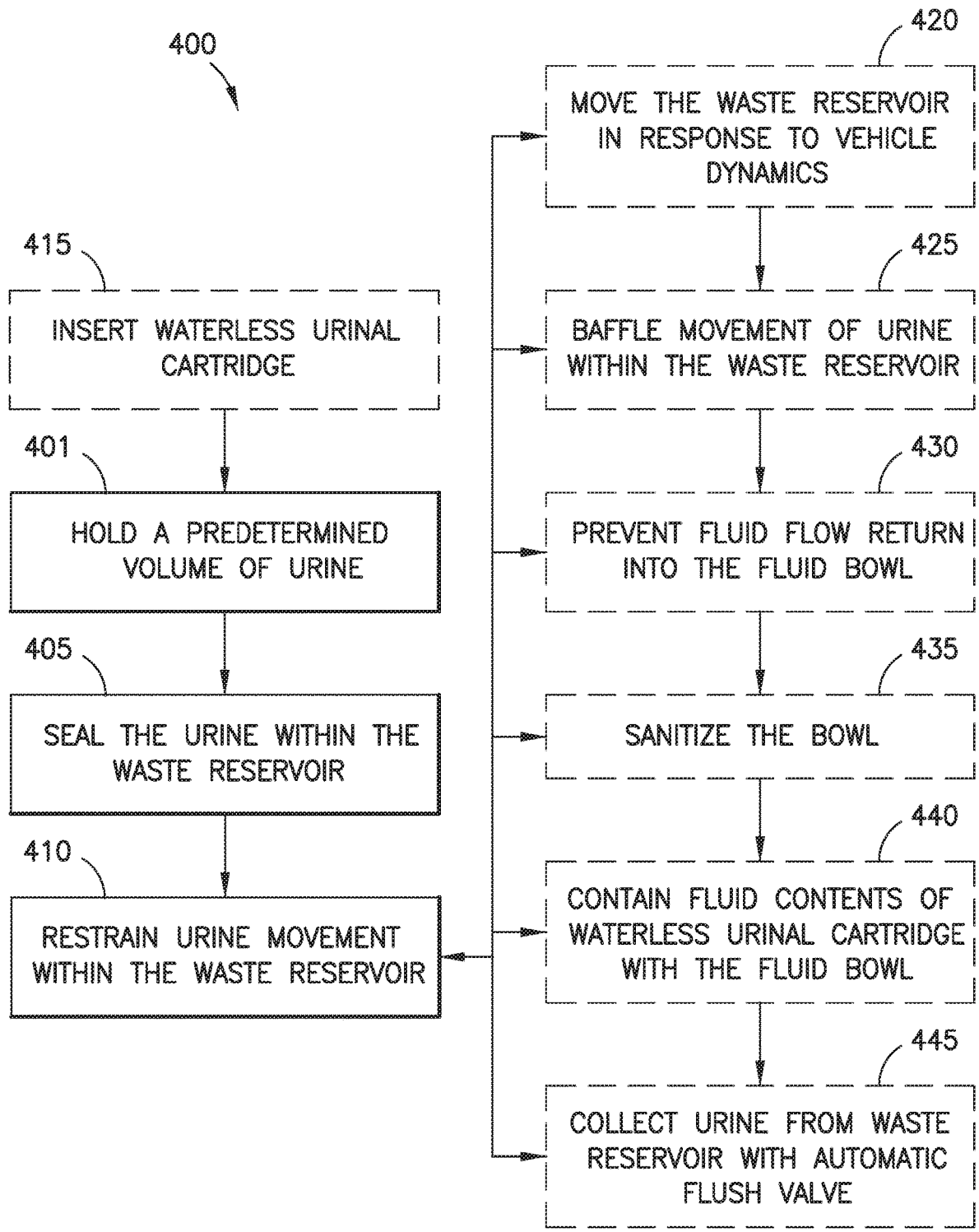

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a top perspective view of a vehicle in accordance with aspects of the present disclosure;

FIG. 1B is a schematic illustration of a waterless urinal of the vehicle in FIG. 1 in accordance with aspects of the present disclosure;

FIG. 2A is a front cross-sectional illustration of a portion of the waterless urinal of FIG. 1B in accordance with aspects of the present disclosure;

FIG. 2B is a side cross-sectional illustration of the portion of the waterless urinal of FIG. 2A in accordance with aspects of the present disclosure;

FIG. 2C is a top perspective view of the portion of the waterless urinal of FIG. 2A in accordance with aspects of the present disclosure;

FIG. 2D is a top perspective view of the portion of the waterless urinal of FIG. 2A in accordance with aspects of the present disclosure;

FIG. 2E is a front cross-sectional illustration of the portion of the waterless urinal of FIG. 2A in accordance with aspects of the present disclosure;

FIG. 2F is a side cross-sectional illustration of the portion of the waterless urinal of FIG. 2A in accordance with aspects of the present disclosure;

FIG. 2G is a top perspective view of a waste reservoir of the waterless urinal of FIG. 2A (and FIG. 3B below) in accordance with aspects of the present disclosure;

FIG. 2H is a bottom perspective view of a cover of the waterless urinal of FIG. 2A (and FIG. 3B below) in accordance with aspects of the present disclosure;

FIG. 3A is a front cross-sectional illustration of a portion of the waterless urinal of FIG. 1B in accordance with aspects of the present disclosure;

FIG. 3B is a top cross-sectional view of the portion of the waterless urinal of FIG. 3A in accordance with aspects of the present disclosure;

FIG. 3C is a side view of a portion of the waterless urinal of FIG. 3A in accordance with aspects of the present disclosure;

FIG. 3D is a front cross-sectional illustration of a portion of the waterless urinal of FIG. 3A in accordance with aspects of the present disclosure; and FIG. 4 is a flow diagram of a method in accordance with aspects of the present disclosure.

DETAILED DESCRIPTION

Referring to FIGS. 1A and 1B, a vehicle 100 including at least one lavatory 110, 111 is illustrated. One or more of the at least one lavatory 110, 111 may be what is referred to herein as a "full lavatory" which includes at least a sink 113 and a toilet 114 (see e.g., lavatory 110). In accordance with the aspects of the present disclosure, one or more of the at least one lavatory 110, 111 includes a waterless urinal 155 as will be described in greater detail herein. The waterless urinal 155 may be included along with the toilet 114 in the full lavatory (e.g., such as lavatory 110); however, in other aspects, the waterless urinal 155 may be included in what will be referred to herein as a "half-lavatory" (e.g., lavatory 111) which includes a sink 113 and only the waterless urinal 155 (e.g., there is no toilet present in the half-lavatory). While the vehicle 100 is described herein as an aerospace vehicle (e.g., an aircraft such as a commercial aircraft) in other aspects the vehicle 100 may be any suitable aerospace, maritime, automotive, and/or other transport that experiences changes in vehicle dynamics (e.g., roll R, pitch P, yaw YW, angle of attack a and/or acceleration in one or more of X, Y, Z axes, or in other words accelerations in any one or more of the six degrees of freedom of the vehicle 100).

Generally, the vehicle 100 includes a frame 100F in which a water supply tank 115 and a waste tank 120 are disposed. The water supply tank 115 is coupled to the sink 113 and toilet 114 in any suitable manner, such as through vehicle water supply plumbing 115P. The water supply tank 115 provides clean or potable water to the sink 113, and provides clean or potable water to the toilet 114 for flushing the toilet 114. The sink 113, toilet 114, and the waterless urinal 155 are coupled to the waste tank 120 in any suitable manner, such as by waste tank plumbing 120P. If the vehicle 100 were to include only toilets 114 in the at least one lavatory 110, 111 the following non-limiting example is provided with respect to the water usage of the at least one lavatory 110, 111. As a non-limiting example, over about a ten hour flight with about 350 passengers onboard the vehicle 100, there may be about 0.3 toilet flushes per passenger which would be about 105 flushes per hour. As such, over the about ten hour flight, there would be about 1050 toilet flushes where each toilet flush uses about 6.8 ounces of water per toilet flush. Given this example, about 7140 ounces or about 446 pounds of water will be used for flushing the toilet. The waterless urinal 155 of the present disclosure may reduce the amount of water used by the passengers of the vehicle 100 as no water is required for disposing of urine collected by the waterless urinal 155. This reduced water usage may also reduce the amount of clean or potable water carried by the vehicle 100 in the water supply tank 115 (and waste water carried by the vehicle 100 in the waste tank 120), which would reduce vehicle weight. The reduced vehicle weight may provide for increased cargo capacity and/or payload capacity of the vehicle or, where cargo/payload capacity is not increased, increased fuel efficiency compared to the same vehicle carrying the additional water.

Further, a half lavatory such as lavatory 111 has a smaller footprint (e.g., uses less cabin space) than a full lavatory such as lavatory 110. The smaller footprint of lavatory 111, which is made possible by the waterless urinal 155, may allow for increased cabin space for passenger seating which may increase the efficiency of the vehicle 100 as more passengers can be carried during a single flight. The smaller footprint of lavatory 111 may also provide increased cabin space for vehicle galleys. Allocating increased space to the vehicle galleys may provide increased food service capabilities onboard the vehicle 100.

The aspects of the present disclosure may also increase the hygienic conditions of the lavatory 110 as passengers who need only urinate may use the waterless urinal 155 in lavatory 111 (or within lavatory 110 if so provided) rather than use the toilet 114. The waterless urinal 155 and the lavatory 111 (e.g., the half lavatory) provided thereby may also provide the following advantages over a conventional full lavatory (with or without a urinal) within a vehicle: simplified maintenance and operation compared to conventional toilets 110 and conventional urinals (which require water to flush); simplified installation during vehicle 100 manufacturing as there is a reduced amount of plumbing necessary when compared to conventional toilets 110 and conventional urinals (which require water to flush), where the reduced amount of plumbing also reduces the weight of the vehicle 100; and a half lavatory including the waterless urinal 155 may be less expensive than a full lavatory.

Referring to FIGS. 1B, 2A, 2G, and 3A, the waterless urinal system 150 includes a waterless urinal 155 that includes a fluid bowl 151 and a waterless urinal cartridge 152. The fluid bowl 151 has a drain 153. The fluid bowl 151 is configured to contain fluid contents of the waterless urinal cartridge where a fluid holding volume FHV1 of the fluid bowl 151 exceeds a fluid holding volume FHV2 of the waterless urinal cartridge 152. In the event that the fluids within the waterless urinal cartridge 152 are emptied into the fluid bowl 151 the fluid holding volume FHV1 may be large enough to substantially contain all of the fluid from the waterless urinal cartridge 152. The fluid bowl 151 includes an inwardly extending fluid retention lip 151RL that extends towards a center 151C of the fluid bowl 151. The fluid retention lip 151RL is configured so that any fluid sloshing or otherwise moving around within the fluid bowl is contained by the fluid retention lip 151RL. For example, fluid flowing along the surface contour SC of the fluid bowl 151 would engage and be contained by the fluid retention lip 151RL rather than exit the fluid bowl. The fluid retention lip 151RL may have a recurved or concave shape (e.g., a shape that curves into the fluid bowl 151 as shown in FIG. 1B) so that as fluid engages the fluid retention lip 151RL that fluid is redirected, by the fluid retention lip 151RL, back into the fluid bowl 151. The fluid retention lip 151RL and the fluid holding volume FHV1 of the fluid bowl 151 may, alone or in combination with the waterless urinal cartridge 152, prevent spillage or splashing of the waterless urinal cartridge 152 contents out of the waterless urinal system 150 during vehicle 100 maneuvers of up to about +2 Gs (or higher) to about −0.5 Gs (or higher) (from straight and level flight in the X-Y plane), up to about a 45 degree roll (about the X axis, and/or during turbulent conditions where up to about 0.5 Gs (or higher) may be encountered.

The waterless urinal cartridge 152 is removably disposed within the drain 153. The waterless urinal cartridge 152 includes a housing 152H and a cover 210. The housing has a waste reservoir 200, 300 disposed within the housing 152H. The waste reservoir 200, 300 is configured to hold a predetermined volume of urine V. The waste reservoir 200, 300 also includes a drainage aperture 201 configured so that an amount of urine VA exceeding the predetermined volume of urine V flows through the drainage aperture 201 to exit the housing 152H. In one aspect the waste reservoir 200, 300 is formed by and integral with the housing 152H while in other aspects the waste reservoir 200, 300 is coupled to the housing 152H in any suitable manner. The waste reservoir 200, 300 comprises a semi-toroidal shape 299 (as shown in FIG. 2G) having an outer perimeter edge 200E1 (as shown in FIG. 2G) that extends above an inner perimeter edge 200E2 (as shown in FIG. 2G) by any suitable distance H. Referring to FIGS. 2A, 2B, 2C, 2D, 2E, and 2F, while the outer perimeter edge 200E1 of the waste reservoir 200 may be above the inner perimeter edge 200E2, urine may pass over one or more of the outer perimeter edge 200E1 and the inner perimeter edge 200E2 to exit the waste reservoir 200, where the housing 152H directs the urine to the drain 153.

The waste reservoir 200, 300 includes at least one fluid flow control feature 260 (as shown in FIGS. 2C, 2D, 3B, 3C) configured to restrain urine movement within the waste reservoir 200, 300 in response to a change in vehicle 100 dynamics (e.g., roll R, pitch P, yaw YW, angle of attack a and/or acceleration in one or more of X, Y, Z axes, or in other words accelerations in any one or more of the six degrees of freedom of the vehicle 100). Referring to FIGS. 2A-2F, in one aspect, the at least one fluid flow control feature 260 includes a gimballed coupling 260G, having any suitable number of gimballed axes, that couples the waste reservoir 200 to the housing 152H. In one aspect, the gimballed coupling 260G includes at least one degree of freedom rotation, the at least one degree of freedom rotation corresponding to one or more of vehicle acceleration, angle of attack a, vehicle roll R, vehicle pitch P and vehicle yaw YW (as shown in FIG. 1A). In one aspect, the gimballed coupling 260G includes at least two degrees of freedom rotation, the at least two degrees of freedom rotation corresponding to at least two of vehicle acceleration, angle of attack a, vehicle roll R, vehicle pitch P and vehicle yaw YW (as shown in FIG. 1A). In still another aspect, the gimballed coupling 260G includes three degrees of freedom rotation, the three degrees of freedom rotation corresponding to vehicle acceleration, angle of attack a, vehicle roll R, vehicle pitch P and vehicle yaw YW (as shown in FIG. 1A). For example, FIG. 2C illustrates a two-axis gimballed coupling 260G2 that provides rotation of the waste reservoir 200 about two axes of rotation PA1, PA2 (which, using the X, Y, Z, coordinate system illustrated in FIG. 1A, may correspond to the X and Y axes). Here the two-axis gimballed coupling 260G2 may provide for relative rotation between the vehicle 100 and the waste reservoir 200 in roll R, pitch P and/or angle of attack a. The two-axis gimballed coupling 260G2 includes a first gimbal frame 280 and a second gimbal frame 281. The first gimbal frame 280 may have any suitable shape so that the first gimbal frame 280 at least partially circumscribes the waste reservoir 200. The first gimbal frame 280 includes pivotal couplings 280CA, 280CB that extend along the axis PA1 and are configured to pivotally couple with a respective corresponding pivotal coupling 152CA, 152CB of the housing 152H (as shown in FIG. 2B). In one aspect, the waste reservoir 200 forms a portion of the gimballed coupling 260G2 such that the second gimbal frame 281 may be formed by the waste reservoir 200. Here the waste reservoir 200 includes pivotal couplings 281CA, 281CB that extend along the axis PA2 and are configured to pivotally couple with a respective corresponding pivotal coupling 280CC, 280CD of the first gimbal frame 281 (as shown in FIG. 2C).

As another example, FIG. 2D illustrates a three-axis gimballed coupling 260G3 that provides rotation of the waste reservoir 200 about three axes of rotation PA1, PA2, PA3 (which, using the X, Y, Z, coordinate system illustrated in FIG. 1A, may correspond to the X, Y and Z axes). Here the three-axis gimballed coupling 260G3 may provide for relative rotation between the vehicle 100 and the waste reservoir 200 in roll R, pitch P, angle of attack a, and/or yaw YW. The three-axis gimballed coupling 260G3 includes the first gimbal frame 280 and the second gimbal frame 281. The first gimbal frame 280 may have any suitable shape so that the first gimbal frame 280 at least partially circumscribes the waste reservoir 200. The first gimbal frame 280 includes pivotal couplings 280CA, 280CB that extend along the axis PA1 and are configured to pivotally couple with a respective corresponding pivotal coupling 152CA, 152CB of the housing 152H (as shown in FIG. 2B). In this aspect, the second gimbal frame 281 has any suitable shape so that the second gimbal frame 281 at least partially circumscribes the waste reservoir 200 such that the second gimbal frame 281 includes pivotal couplings 281CA, 281CB that extend along the axis PA2 and are configured to pivotally couple with a respective corresponding pivotal coupling 280CC, 280CD of the first gimbal frame 280 (as shown in FIG. 2D). In this aspect, the waste reservoir 200 is coupled to the second gimbal frame 281 by any suitable pivotal coupling 282, such as a bearing ring, so that the waste reservoir 200 pivots about axis of rotation PA3.

The waste reservoir 200 may be coupled to the gimballed coupling 260G so that a center of gravity CG of the waste reservoir 200 is on an opposite side of one or more axes of rotation PA1, PA2 of the gimballed coupling 260G than the plurality of fluid passages 152A. Having the center of gravity CG of the waste reservoir 200 on the opposite side of one or more axes of rotation PA1, PA2 of the gimballed coupling 260G than the plurality of fluid passages 152A keeps the waste reservoir 200 in a substantially horizontal orientation (e.g., with horizontal meaning, within the context of the X, Y, Z coordinate system shown in FIG. 1A, laying within the X-Y plane) so that an opening 200X from which the amount of urine VA exits the waste reservoir 200 remains in a substantially upward facing direction (e.g., so as to not tip releasing urine from the waste reservoir 200).

Referring to FIGS. 2G, 3A, 3B and 3C the at least one fluid flow control feature 260 includes at least one baffle 261 disposed within the waste reservoir 200, 300. While about eight baffles 261 are illustrated in FIG. 3B it should be understood that any suitable number of baffles 261 may be provided such as more or less than about eight baffles 261. For example, the at least one baffle 261 may be used in combination with the gimballed coupling 260G (see FIG. 2G which illustrates the at least one baffle 261 within the waste reservoir 200) or in lieu of (e.g., instead of) the gimballed coupling 260G. For example, in one aspect, the waste reservoir 300 is substantially similar to the waste reservoir 200 however; here the waste reservoir 300 forms the housing 152H. In this aspect, the waste reservoir 300 is placed within the drain 153 such that there is no relative rotation between the waste reservoir 300 and the vehicle 100. The at least one baffle 261 may have any suitable shape and size to substantially mitigate movement (e.g., sloshing) of the urine within the waste reservoir 200, 300. For example, the at least one baffle 261 includes a frame 261F. The frame 261F forms a peripheral edge 261PE that has a contour 261C that substantially matches a contour 200C of the waste reservoir 200. The frame 261F also includes a first side surface 261S1, a second side surface 261S2 and a bottom surface 261SS which together interface with the urine within the waste reservoir 200, 300 to baffle movement of the urine within the waste reservoir 200. In one aspect, the first side surface 261S1, second side surface 261S2 and bottom surface 261SS are constructed of a mesh material, a solid material or any other suitable material that slows and/or limits movement of the urine within the waste reservoir 200, 300. The first side surface 261S1, second side surface 261S2 and bottom surface 261SS form a channel 261CH configured so that the seal fluid reservoir 211 is disposed within the channel 261CH (as shown in FIG. 3A). The channel 261CH may also be shaped and sized to allow for relative movement between the seal fluid reservoir 211 and the at least one baffle 261 such as when the waste reservoir 200 is coupled to the housing 152H by the gimballed coupling 260G.

In one aspect, one or more of the waste reservoir 200, 300, the seal fluid reservoir 211 and the at least one baffle 261 may include any suitable chamfers 399. The chamfers 399 may provide clearance for moving parts, make assembly of the waterless urinal cartridge 152 easier (compared to a substantially similar waterless urinal cartridge lacking the chamfers), and/or may provide a laminar flow of urine from the waste reservoir 200, 300 to the drain 153.

Referring to FIGS. 1B, 2A, 2H, and 3A, the waterless urinal cartridge 152 also includes a cover 210 coupled to the housing 152H in any suitable manner (e.g., such as by welding, chemical fasteners, mechanical fasteners (including threaded connections), etc.), where the cover 210 forms part of a surface contour SC of the fluid bowl 151. In the aspect of the present disclosure shown in FIGS. 3A-3D the cover is coupled directly to the waste reservoir 300 because, as described above, the waste reservoir 300 forms the housing 152H. The cover 210 includes a sealing fluid reservoir 211 and a plurality of fluid passages 152A for directing urine from the fluid bowl 151 to the sealing fluid reservoir 211. The sealing fluid reservoir 211 is in communication with an internal cavity 220 of the housing 152H. For example, the sealing fluid reservoir 211 may have any suitable shape, such as a cylindrical shape, so that at least a portion of the sealing fluid reservoir 211 is disposed within the waste reservoir 200, 300 (see FIGS. 2A and 3A) to form a fluid passage labyrinth LB (see FIGS. 2B and 3A) so that at least a portion of an internal volume of the sealing fluid reservoir 211 is shared with at least a portion of an internal volume of the waste reservoir 200, 300. For example, the sealing fluid reservoir 211 includes walls 211W1, 211W2 that extend into the opening 200X of the waste reservoir 200, 300 by any suitable distance HL to form the fluid passage labyrinth LB (see FIGS. 2B and 3A) so that the sealing fluid SF substantially does not escape the sealing fluid reservoir 211 during high angle changes in vehicle dynamics. For example, the vehicle 100 at cruise may have angle changes of about 2 degrees to about 4 degrees relative to at least the X and Y axes (shown in FIG. 1A) of the aircraft 100 during cruise of the vehicle. However, when banking there may be high angle changes in vehicle dynamics of about 20 degrees to about 25 degrees (in other aspects the bank angles may be more than about 25 degrees or less than about 20 degrees). The sealing fluid SF contained or otherwise held by the sealing fluid reservoir 211 is less dense than water so as to float on top of the urine, contained in or otherwise held by the waste reservoir 200, 300, within what may be referred to as an inverted cup 211C (see FIGS. 2A and 3A) formed by the sealing fluid reservoir 211 (e.g., the lower density of the sealing fluid SF compared to the density of urine in combination with the inverted cup 211C holds the sealing fluid SF within the sealing fluid reservoir 211).

Each of the plurality of fluid passages 152A has a shape and size configured to substantially prevent egress of fluid passage (e.g., urine and/or sealing fluid) from the waste reservoir 200, 300 to the fluid bowl 151. For example, the shape and size of each of the plurality of fluid passages 152A is such that the plurality of fluid passages 152A form a baffle for substantially preventing fluid from splashing from the sealing fluid reservoir 211 and/or waste reservoir 200, 300 during, for example, exertion of negative G forces on the vehicle 100. In one aspect, each of the plurality of fluid passages 152A has a diameter of about 0.094 inches however; in other aspects the plurality of fluid passages 152A may have any suitable diameter greater or less than about 0.094 inches. In yet another aspect, one or more of the plurality of fluid passages 152A may have a diameter that is larger or smaller than a diameter of another one of the plurality of fluid passages 152A (e.g., the diameter of the fluid passages 152A may vary from one fluid passage 152A to another fluid passage 152A). The plurality of fluid passages 152A form a filter that substantially prevents solid material passage into the waste reservoir 200.

Referring again to FIGS. 1A and 1B, the waterless urinal 155 further includes an automatic flush valve 170 coupled to the drain 153 and the vehicle waste tank 120, wherein urine from the waste reservoir 200, 300 (see, e.g., FIGS. 2A and 3A) is collected within the automatic flush valve 170. Collected urine CU is flushed from the automatic flush valve 170 to the waste tank 120 upon a predetermined level of urine being present within the automatic flush valve 170. For example, the automatic flush valve 170 may include any suitable sensors 170S, such as optical sensors, weight scales, conductive sensors, etc., for sensing a predetermined level of collected urine CU within the automatic flush valve 170. The sensors 170S may be coupled to any suitable controller 199, which may be any suitable digital or analog controller. The controller 199 is configured to actuate the automatic flush valve 170 upon detection/sensing of the predetermined level of collected urine CU within the automatic flush valve 170 so that the collected urine CU is flushed to the waste tank 120.

Upon flushing of the automatic flush valve 170 replacement air RA (that fills the automatic flush valve upon fluid exit) is drawn into the automatic flush valve 170. It may be undesirable to source the replacement air RA through the drain 153 as the suction caused by the automatic flush valve 170 may remove urine and/or sealing fluid SF from the waste reservoir 200, 300 and/or sealing fluid reservoir 211. To avoid or at least mitigate formation of a vacuum within the drain 153 (and hence, within the waste reservoir 200, 300 and/or sealing fluid reservoir 211) a vent line 180 is provided and coupled to both the drain 153 and the automatic flush valve 170. The vent line 180 includes an air silencer 180S or other suitable muffler configured to muffle the sound, relative to the cabin of the vehicle 100, of the replacement air RA being sucked into the vent line 180 as the automatic flush valve 170 is flushed. A fluid flow stop valve 180V is disposed between the drain 153 and the automatic flush valve 170. The fluid flow stop valve 180V is configured to seal the drain 153 when urine is flushed from the automatic flush valve 170 to stop a flow of air through the drain 153 (e.g., to prevent replacement air from being drawn through the drain 153) as the automatic flush valve 170 is flushed. In one aspect, the fluid flow stop valve 180V may be a passive valve that is actuated by the air suction created when the automatic flush valve 170 is flushed; while in other aspects, the fluid flow stop valve 180V may be a motorized valve that is actuated by the controller 199 when the automatic flush valve 170 is flushed.

Still referring to FIGS. 1A and 1B, the waterless urinal system 150 further includes odor and germicidal mitigation. For example, a one way valve 154 or any other suitable check valve may be disposed within the drain 153. The one way valve 154 is configured so that urine may flow through the one way valve 154 towards the automatic flush valve 170; however, odors are prevented by the one way valve 154 from passing from the automatic flush valve 170 to the waterless urinal cartridge 152. Odors may also be prevented from escaping through the fluid passages 152A of the waterless urinal cartridge 152 by the sealing fluid SF disposed within the sealing fluid reservoir 211 and floating on top of the urine within the waste reservoir 200, 300 (see, e.g., FIGS. 2A and 3A).

The waterless urinal system 150 may also include a sanitation module 160 that is coupled to the fluid bowl 151. The sanitation module 160 includes at least one of a deodorizer 161DA and disinfectant 161DB dispenser 161. The deodorizer 161DA and disinfectant 161DB may be any suitable deodorizer and disinfectant that are separate from each other or combined into a single mixture. The dispenser 161 includes any suitable spray nozzle 161S configured to mist or otherwise spray at least one of the deodorizer 161DA and disinfectant 161DB into at least a portion of the fluid bowl 151 to mask/mitigate any odors from urine wetting the fluid bowl 151 and/or to disinfect the surface contour SC of at least the portion of the fluid bowl 151. The sanitation module 160 may also include an ultraviolet germicidal irradiation unit 162. The ultraviolet germicidal irradiation unit 162 may be coupled to the fluid bowl 151 in any suitable manner so as to direct ultraviolet radiation into at least a portion of the fluid bowl 151 and/or around at least a portion of the fluid retention lip 151RL to disinfect the fluid bowl 151 and/or fluid retention lip 151RL. The at least one of a deodorizer 161DA and disinfectant 161DB dispenser 161 and the ultraviolet germicidal irradiation unit 162 may be used separately or in combination to sanitize and/or deodorize the fluid bowl 151. The sanitation module 160 may include a presence detector 165 configured to sense one or more of a presence and absence of a user 169 that is or was standing in front of the waterless urinal 155 fluid bowl 151. The presence detector 165 is coupled to any suitable controller 199A to effect sanitation of the fluid bowl 151 with the sanitation module 160 upon detection of the one or more of the presence and the absence of the user 169. The controller 199A may be a standalone controller or the controller 199A may be part of controller 199. As an example, in response to the sensing of one or more of the presence and the absence of the user 169 by the presence detector 165, the controller 199A may actuate the dispenser 161 to dispense at least one of the deodorizer 161DA and disinfectant 161DB through the spray nozzle 161S. The controller 199A may also, in response to the sensing of one or more of the presence and the absence of the user 169 by the presence detector 165, actuate the ultraviolet germicidal irradiation unit 162 so that ultraviolet radiation is projected onto the surface contour surface SC of the fluid bowl 151 and/or the fluid retention lip 151RL.

Referring now to FIGS. 1A, 1B, 2E, 2F, and 3D an exemplary method 400 for using the waterless urinal 155 within the vehicle 100 will be described. The waterless urinal cartridge 152 may be inserted into the fluid bowl 151 of the waterless urinal 155 (FIG. 4, Block 415). The method 400 includes holding a predetermined volume of urine V (FIG. 4, Block 401) within a waste reservoir 200, 300 of the waterless urinal cartridge 152 disposed in the fluid bowl 151 of the waterless urinal 155. As described above, urine passes through a drainage aperture 201 of the waste reservoir 200, 300 when an amount of urine exceeds the predetermined volume of urine V so that urine exits the waterless urinal cartridge 200, 300. The method 400 also includes sealing the urine within the waste reservoir 200, 300 (FIG. 4, Block 405) with one or more of a sealing fluid SF disposed within a sealing fluid reservoir 211 of a cover 210 of the waterless urinal cartridge 152, and a plurality of fluid passages 152A disposed in the cover 210, where the plurality of fluid passages 152A direct urine from the fluid bowl 151 to the sealing fluid reservoir 211 and the sealing fluid reservoir 211 is in communication with the waste reservoir 200, 300. Urine movement is restrained within the waste reservoir 200, 300 (FIG. 4, Block 410), with at least one fluid flow control feature 260 of the waste reservoir 200, 300, in response to a change in vehicle 100 dynamics.

In one aspect, urine movement is restrained by moving the waste reservoir 200, e.g., relative to the vehicle 100, in response to the change in vehicle 100 dynamics (FIG. 4, Block 420) using a gimballed coupling 260G that couples the waste reservoir 200 to a housing 152H of the waterless urinal cartridge 152. The movement of the waste reservoir 200 relative to the vehicle 100 using the gimballed coupling 260G is illustrated in FIGS. 2E and 2F which respectively show front and side cross sectional views of the waste reservoir 200 movement. Here the gimballed coupling 260G provides rotation of the waste reservoir 200 about pivot point PP through any suitable angle θ which is limited only by interference between the waste reservoir 200 and the cover 210. As described above, the cover 210 and the waste reservoir 200 may include any suitable chamfers 399 to increase the clearances between the cover 210 and the waste reservoir 200 for increasing the angle θ of rotation of the waste reservoir 200. As described above, in one aspect, the waste reservoir 200 is moved in at least one degree of freedom rotation corresponding to one or more of vehicle acceleration, angle of attack a, vehicle roll R, vehicle pitch P and vehicle yaw YW. In one aspect, the waste reservoir 200 is moved in at least two degrees of freedom rotation corresponding to at least two of vehicle acceleration, angle of attack a, vehicle roll R, vehicle pitch P and vehicle yaw YW. In one aspect, the waste reservoir 200 is moved in three degrees of freedom rotation corresponding to vehicle acceleration, angle of attack a, vehicle roll R, vehicle pitch P and vehicle yaw YW. In addition to, or in lieu of, moving the waste reservoir 200 in response to the vehicle 100 dynamics, movement of urine may be baffled within the waste reservoir 200 (FIG. 4, Block 425) with at least one baffle disposed within the waste reservoir. An exemplary illustration of the baffled urine within the waste reservoir 300 is illustrated in FIG. 3D where the vehicle 100 dynamics have changed in roll R. Here the sloshing of the urine is at least reduced by the baffles 261 so that urine substantially does not splash within the waste reservoir 300.

The method 400 may also include preventing fluid flow from returning into the fluid bowl 151 (FIG. 4, Block 430) with a one way valve 154 coupled to a drain 153 of the fluid bowl 151. The method 400 may also include sanitizing the fluid bowl 151 (FIG. 4, Block 435) with a sanitation module 160 coupled to the fluid bowl 151. As described above, sanitizing includes sanitation of at least a portion of the fluid bowl 151 with at least one of a deodorizer 161DA and disinfectant 161DB dispenser 161. Sanitizing may also include sanitation of at least the fluid bowl 151 with an ultraviolet germicidal irradiation unit 162. Sanitizing the fluid bowl 151 may include sensing one or more of a presence and absence of a user 169 with a presence detector 165 of the waterless urinal 155, and sanitizing the fluid bowl 151 upon detection of the one or more of the presence and the absence of the user 169. The method 400 may include containing fluid contents of the waterless urinal cartridge 152 with the fluid bowl 151 (FIG. 4, Block 440), where a fluid holding volume of the fluid bowl 151 exceeds a fluid holding volume of the waterless urinal cartridge 152. The method 400 may also include collecting urine from the waste reservoir 200, 300 within an automatic flush valve 170 (FIG. 4, Block 445) coupled to the drain 153 of the fluid bowl 151 and the vehicle waste tank 120. Collecting the urine with the automatic flush valve 170 includes flushing collected urine CU to the vehicle waste tank 120 upon a predetermined level of urine being present within the automatic flush valve 170. Collecting the urine with the automatic flush valve 170 may also include receiving air into the automatic flush valve 170 through a vent line 180 that includes an air silencer 180S when the collected urine CU is flushed by the automatic flush valve 170. Collecting the urine with the automatic flush valve 170 may further include sealing a drain 153 of the fluid bowl 151 with a fluid flow stop valve 180V, disposed between the drain 153 and the automatic flush valve 170, when the collected urine CU is flushed from the automatic flush valve 170.

As described above, the waterless urinal 155 provides for no flush user urination that functions (e.g., substantially without leakage and/or splashing from the fluid bowl 151 and/or waterless urinal cartridge 152) in a dynamic environment (e.g., an environment that is not fixed or static). The waterless urinal cartridge 152 and/or fluid bowl 151 may not lose effectivity of sealing/containing the urine within the waterless urinal cartridge 152 and/or fluid bowl 151 when the waterless urinal cartridge 152 is tilted and/or jostled (e.g. such as during in flight turbulence in the case of an aerial vehicle or over rough terrain/water in the case of terrestrial/maritime vehicles). The waterless urinal 155 may also prevent urine from escaping during negative G events such as turbulence.

The following are provided in accordance with the aspects of the present disclosure:

A1. A waterless urinal for a vehicle, the waterless urinal comprising:

a fluid bowl having a drain; and a waterless urinal cartridge removably disposed within the drain, the waterless urinal cartridge including a housing having a waste reservoir disposed within the housing and being configured to hold a predetermined volume of urine, and a drainage aperture configured so that an amount of urine exceeding the predetermined volume of urine flows through the drainage aperture to exit the housing, and a cover coupled to the housing and forming part of a surface contour of the fluid bowl, the cover including a sealing fluid reservoir and a plurality of fluid passages for directing urine from the fluid bowl to the sealing fluid reservoir, the sealing fluid reservoir being in communication with an internal cavity of the housing, wherein the waste reservoir includes at least one fluid flow control feature configured to restrain urine movement within the waste reservoir in response to a change in vehicle dynamics.

A2. The waterless urinal of paragraph A1, wherein the vehicle dynamics include one or more of vehicle acceleration, angle of attack, vehicle roll, vehicle pitch, and vehicle yaw.

A3. The waterless urinal of paragraph A1, wherein the at least one fluid flow control feature comprises a gimballed coupling that couples the waste reservoir to the housing.

A4. The waterless urinal of paragraph A3, wherein a center of gravity of the waste reservoir is on an opposite side of one or more axes of rotation of the gimballed coupling than the plurality of fluid passages.

A5. The waterless urinal of paragraph A3, wherein the gimballed coupling includes at least one degree of freedom rotation, the at least one degree of freedom rotation corresponding to one or more of vehicle acceleration, angle of attack, vehicle roll, vehicle pitch and vehicle yaw.

A6. The waterless urinal of paragraph A3, wherein the gimballed coupling includes at least two degrees of freedom rotation, the at least two degrees of freedom rotation corresponding to at least two of vehicle acceleration, angle of attack, vehicle roll, vehicle pitch and vehicle yaw.

A7. The waterless urinal of paragraph A3, wherein the gimballed coupling includes three degrees of freedom rotation, the three degrees of freedom rotation corresponding to vehicle acceleration, angle of attack, vehicle roll, vehicle pitch and vehicle yaw.

A8. The waterless urinal of paragraph A3, wherein the waste reservoir forms a portion of the gimballed coupling.

A9. The waterless urinal of paragraph A3, wherein the at least one fluid flow control feature comprises at least one baffle disposed within the waste reservoir.

A10. The waterless urinal of paragraph A1, wherein the at least one fluid flow control feature comprises at least one baffle disposed within the waste reservoir.

A11. The waterless urinal of paragraph A1, wherein the waste reservoir comprises a semi-toroidal shape having an outer perimeter edge that extends above an inner perimeter edge.

A12. The waterless urinal of paragraph A1, wherein each of the plurality of fluid passages has a shape and size configured to substantially prevent egress of fluid passage from the waste reservoir to the fluid bowl.

A13. The waterless urinal of paragraph A12, wherein each of the plurality of fluid passages has a diameter of about 0.094 inches.

A14. The waterless urinal of paragraph A1, wherein the plurality of fluid passages form a filter that substantially prevents solid material passage into the waste reservoir.

A15. The waterless urinal of paragraph A1, further comprising a one way valve coupled to the drain of the fluid bowl.

A16. The waterless urinal of paragraph A1, further comprising a sanitation module coupled to the fluid bowl.

A17. The waterless urinal of paragraph A16, wherein the sanitation module includes at least one of a deodorizer and disinfectant dispenser.

A18. The waterless urinal of paragraph A16, wherein the sanitation module includes an ultraviolet germicidal irradiation unit.

A19. The waterless urinal of paragraph A16, wherein the sanitation module includes a presence detector configured to sense one or more of a presence and absence of a user, the presence detector being coupled to a controller to effect sanitation of the fluid bowl with the sanitation module upon detection of the one or more of the presence and the absence of the user.

A20. The waterless urinal of paragraph A1, wherein the fluid bowl is configured to contain fluid contents of the waterless urinal cartridge where a fluid holding volume of the fluid bowl exceeds a fluid holding volume of the waterless urinal cartridge.

A21. The waterless urinal of paragraph A1, wherein the fluid bowl includes an inwardly extending fluid retention lip that extends towards a center of the fluid bowl.

A22. The waterless urinal of paragraph A1, further comprising an automatic flush valve coupled to the drain and a vehicle waste tank, wherein urine from the waste reservoir is collected within the automatic flush valve.

A23. The waterless urinal of paragraph A22, wherein collected urine is flushed to the vehicle waste tank upon a predetermined level of urine being present within the automatic flush valve.

A24. The waterless urinal of paragraph A22, further comprising a vent line including an air silencer, the vent line being coupled to the automatic flush valve.

A25. The waterless urinal of paragraph A24, further comprising a fluid flow stop valve disposed between the drain and the automatic flush valve, the fluid flow stop valve being configured to seal the drain when urine is flushed from the automatic flush valve.

B1. A vehicle comprising:
a lavatory; and
a waterless urinal disposed within the lavatory, the waterless urinal including
a fluid bowl having a drain; and
a waterless urinal cartridge removably disposed within the drain, the waterless urinal cartridge including
a housing having a waste reservoir disposed within the housing and being configured to hold a predetermined volume of urine, and a drainage aperture configured so that an amount of urine exceeding the predetermined volume of urine flows through the drainage aperture to exit the housing, and
a cover coupled to the housing and forming part of a surface contour of the fluid bowl, the cover including a sealing fluid reservoir and a plurality of fluid passages for directing urine from the fluid bowl to the sealing fluid reservoir, the sealing fluid reservoir being in communication with an internal cavity of the housing,
wherein the waste reservoir includes at least one fluid flow control feature configured to restrain urine movement within waste reservoir in response to a change in vehicle dynamics.

B2. The vehicle of paragraph B1, wherein the vehicle dynamics include one or more of vehicle roll, vehicle pitch, and vehicle yaw.

B3. The vehicle of paragraph B1, wherein the at least one fluid flow control feature comprises a gimballed coupling that couples the waste reservoir to the housing.

B4. The vehicle of paragraph B3, wherein a center of gravity of the waste reservoir is on an opposite side of one or more axes of rotation of the gimballed coupling than the plurality of fluid passages.

B5. The vehicle of paragraph B3, wherein the gimballed coupling includes at least one degree of freedom rotation, the at least one degree of freedom rotation corresponding to one or more of vehicle acceleration, angle of attack, vehicle roll, vehicle pitch and vehicle yaw.

B6. The vehicle of paragraph B3, wherein the gimballed coupling includes at least two degrees of freedom rotation, the at least two degrees of freedom rotation corresponding to at least two of vehicle acceleration, angle of attack, vehicle roll, vehicle pitch and vehicle yaw.

B7. The vehicle of paragraph B3, wherein the gimballed coupling includes three degrees of freedom rotation, the three degrees of freedom rotation corresponding to vehicle acceleration, angle of attack, vehicle roll, vehicle pitch and vehicle yaw.

B8. The vehicle of paragraph B3, wherein the waste reservoir forms a portion of the gimballed coupling.

B9. The vehicle of paragraph B3, wherein the at least one fluid flow control feature comprises at least one baffle disposed within the waste reservoir.

B10. The vehicle of paragraph B1, wherein the at least one fluid flow control feature comprises at least one baffle disposed within the waste reservoir.

B11. The vehicle of paragraph B1, wherein the waste reservoir comprises a semi-toroidal shape having an outer perimeter edge that extends above an inner perimeter edge.

B12. The vehicle of paragraph B1, wherein each of the plurality of fluid passages has a shape and size configured to substantially prevent egress of fluid passage from the waste reservoir to the fluid bowl.

B13. The vehicle of paragraph B12, wherein each of the plurality of fluid passages has a diameter of about 0.094 inches.

B14. The vehicle of paragraph B1, wherein the plurality of fluid passages form a filter that substantially prevents solid material passage into the waste reservoir.

B15. The vehicle of paragraph B1, further comprising a one way valve coupled to the drain of the fluid bowl.

B16. The vehicle of paragraph B1, further comprising a sanitation module coupled to the fluid bowl.

B17. The vehicle of paragraph B16, wherein the sanitation module includes at least one of a deodorizer and disinfectant dispenser.

B18. The vehicle of paragraph B16, wherein the sanitation module includes an ultraviolet germicidal irradiation unit.

B19. The vehicle of paragraph B16, wherein the sanitation module includes a presence detector configured to sense one or more of a presence and absence of a user, the presence detector being coupled to a controller to effect sanitation of the fluid bowl with the sanitation module upon detection of the one or more of the presence and the absence of the user.

B20. The vehicle of paragraph B1, wherein the fluid bowl is configured to contain fluid contents of the waterless urinal cartridge where a fluid holding volume of the fluid bowl exceeds a fluid holding volume of the waterless urinal cartridge.

B21. The vehicle of paragraph B1, wherein the fluid bowl includes an inwardly extending fluid retention lip that extends towards a center of the fluid bowl.

B22. The vehicle of paragraph B1, further comprising an automatic flush valve coupled to the drain and a vehicle waste tank, wherein urine from the waste reservoir is collected within the automatic flush valve.

B23. The vehicle of paragraph B22, wherein collected urine is flushed to the vehicle waste tank upon a predetermined level of urine being present within the automatic flush valve.

B24. The vehicle of paragraph B22, further comprising a vent line including an air silencer, the vent line being coupled to the automatic flush valve.

B25. The vehicle of paragraph B24, further comprising a fluid flow stop valve disposed between the drain and the automatic flush valve, the fluid flow stop valve being configured to seal the drain when urine is flushed from the automatic flush valve.

C1. A method for using a waterless urinal within a vehicle, the method comprising:

holding a predetermined volume of urine within a waste reservoir of a waterless urinal cartridge disposed in a fluid bowl of the waterless urinal, where urine passes through a drainage aperture of the waste reservoir when an amount of urine exceeds the predetermined volume of urine so that urine exits the waterless urinal cartridge;

sealing the urine within the waste reservoir with one or more of a sealing fluid disposed within a sealing fluid reservoir of a cover of the waterless urinal cartridge, and a plurality of fluid passages disposed in the cover, where the plurality of fluid passages direct urine from the fluid bowl to the sealing fluid reservoir and the sealing fluid reservoir is in communication with the waste reservoir; and restraining urine movement within the waste reservoir, with at least one fluid flow control feature of the waste reservoir, in response to a change in vehicle dynamics.

C2. The method of paragraph C1, further comprising inserting the waterless urinal cartridge into the fluid bowl of the waterless urinal.

C3. The method of paragraph C1, wherein the vehicle dynamics include one or more of vehicle roll, vehicle pitch, and vehicle yaw.

C4. The method of paragraph C1, further comprising moving the waste reservoir in response to the change in vehicle dynamics using a gimballed coupling that couples the waste reservoir to a housing of the waterless urinal cartridge.

C5. The method of paragraph C4, wherein the waste reservoir is moved in at least one degree of freedom rotation corresponding to one or more of vehicle acceleration, angle of attack, vehicle roll, vehicle pitch and vehicle yaw.

C6. The method of paragraph C4, wherein the waste reservoir is moved in at least two degrees of freedom rotation corresponding to at least two of vehicle acceleration, angle of attack, vehicle roll, vehicle pitch and vehicle yaw.

C7. The method of paragraph C4, wherein the waste reservoir is moved in three degrees of freedom rotation corresponding to vehicle acceleration, angle of attack, vehicle roll, vehicle pitch and vehicle yaw.

C8. The method of paragraph C1, further comprising baffling movement of urine within the waste reservoir with at least one baffle disposed within the waste reservoir.

C9. The method of paragraph C1, further comprising preventing fluid flow from returning into the fluid bowl with a one way valve coupled to a drain of the fluid bowl.

C10. The method of paragraph C1, further comprising sanitizing the fluid bowl with a sanitation module coupled to the fluid bowl.

C11. The method of paragraph C10, wherein sanitizing includes sanitation with at least one of a deodorizer and disinfectant dispenser.

C12. The method of paragraph C10, wherein sanitizing includes sanitation with an ultraviolet germicidal irradiation unit.

C13. The method of paragraph C10, further comprising sensing one or more of a presence and absence of a user with a presence detector of the waterless urinal, and sanitizing the fluid bowl upon detection of the one or more of the presence and the absence of the user.

C14. The method of paragraph C1, further comprising containing fluid contents of the waterless urinal cartridge with the fluid bowl, where a fluid holding volume of the fluid bowl exceeds a fluid holding volume of the waterless urinal cartridge.

C15. The method of paragraph C1, further comprising collecting urine from the waste reservoir within an automatic flush valve coupled to a drain of the fluid bowl and a vehicle waste tank.

C16. The method of paragraph C15, further comprising flushing collected urine to the vehicle waste tank upon a predetermined level of urine being present within the automatic flush valve.

C17. The method of paragraph C16, further comprising receiving air into the automatic flush valve through a vent line that includes an air silencer when the collected urine is flushed by the automatic flush valve.

C18. The method of paragraph C17, further comprising sealing a drain of the fluid bowl with a fluid flow stop valve, disposed between the drain and the automatic flush valve, when the collected urine is flushed from the automatic flush valve.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 4, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 4 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A waterless urinal cartridge configured for insertion into a waterless urinal, the waterless urinal cartridge comprising:
    a housing having
        a waste reservoir disposed within the housing and being configured to hold a predetermined volume of wastewater, and
        a drainage aperture configured so that an amount of wastewater exceeding the predetermined volume of wastewater flows through the drainage aperture to exit the housing, and
    a cover coupled to the housing and being configured to form part of a surface contour of a fluid bowl of the waterless urinal, the cover including
        a sealing fluid reservoir having walls that are separate and distinct from the housing that define the waste reservoir and the drainage aperture, the walls of the sealing fluid reservoir form a containment perimeter with an open bottom so as to contain a sealing fluid floating on top of the predetermined volume of wastewater, and
        a plurality of fluid passages for directing wastewater from the fluid bowl to the sealing fluid reservoir, the sealing fluid reservoir being in communication with an internal cavity of the housing,
    wherein the waste reservoir includes at least one fluid flow control feature configured to restrain wastewater movement within the waste reservoir in response to a change in vehicle dynamics.

2. The waterless urinal cartridge of claim 1, wherein the vehicle dynamics include one or more of vehicle roll, vehicle pitch, and vehicle yaw.

3. The waterless urinal cartridge of claim 1, wherein the at least one fluid flow control feature comprises a gimballed coupling that couples the waste reservoir to the housing.

4. The waterless urinal cartridge of claim 3, wherein the gimballed coupling includes at least one degree of freedom rotation, the at least one degree of freedom rotation corresponding to one or more of vehicle acceleration, angle of attack, vehicle roll, vehicle pitch and vehicle yaw.

5. The waterless urinal cartridge of claim 3, wherein the waste reservoir forms a portion of the gimballed coupling.

6. The waterless urinal cartridge of claim 3, wherein the at least one fluid flow control feature comprises at least one baffle disposed within the waste reservoir.

7. The waterless urinal cartridge of claim 3, wherein a center of gravity of the waste reservoir is on an opposite side of one or more axes of rotation of the gimballed coupling than the plurality of fluid passages.

8. The waterless urinal cartridge of claim 3, wherein the plurality of fluid passages form a filter that substantially prevents solid material passage into the waste reservoir.

9. The waterless urinal cartridge of claim 1, wherein the at least one fluid flow control feature comprises at least one baffle disposed within the waste reservoir.

10. The waterless urinal cartridge of claim 1, wherein each of the plurality of fluid passages has a shape and size configured to substantially prevent egress of fluid passage from the waste reservoir to the fluid bowl.

11. A waterless urinal for a vehicle, the waterless urinal comprising:
a waterless urinal cartridge removably disposed within a drain of the waterless urinal, the waterless urinal cartridge including
a housing having
a waste reservoir disposed within the housing and being configured to hold a predetermined volume of wastewater, and
a drainage aperture configured so that an amount of wastewater exceeding the predetermined volume of wastewater flows through the drainage aperture to exit the housing, and
a cover coupled to the housing, the cover including
a sealing fluid reservoir having walls that are separate and distinct from the housing that define the waste reservoir and the drainage aperture, the walls of the sealing fluid reservoir form a containment perimeter with an open bottom so as to contain a sealing fluid floating on top of the predetermined volume of wastewater, and
a plurality of fluid passages for directing wastewater from a fluid bowl of the waterless urinal to the sealing fluid reservoir, the sealing fluid reservoir being in communication with an internal cavity of the housing,
wherein the waste reservoir includes at least one fluid flow control feature configured to restrain wastewater movement within the waste reservoir in response to a change in vehicle dynamics.

12. The waterless urinal of claim 11, wherein the vehicle dynamics include one or more of vehicle roll, vehicle pitch, and vehicle yaw.

13. The waterless urinal of claim 11, wherein the at least one fluid flow control feature comprises a gimballed coupling that couples the waste reservoir to the housing.

14. The waterless urinal of claim 13, wherein the gimballed coupling includes at least one degree of freedom rotation, the at least one degree of freedom rotation corresponding to one or more of vehicle acceleration, angle of attack, vehicle roll, vehicle pitch and vehicle yaw.

15. The waterless urinal of claim 13, wherein the waste reservoir forms a portion of the gimballed coupling.

16. The waterless urinal of claim 13, wherein the at least one fluid flow control feature comprises at least one baffle disposed within the waste reservoir.

17. The waterless urinal of claim 11, wherein the at least one fluid flow control feature comprises at least one baffle disposed within the waste reservoir.

18. The waterless urinal of claim 11, wherein each of the plurality of fluid passages has a shape and size configured to substantially prevent egress of fluid passage from the waste reservoir to the fluid bowl.

19. The waterless urinal of claim 11, further comprising a sanitation module coupled to a fluid bowl of the waterless urinal.

20. The waterless urinal of claim 19, wherein the sanitation module includes a presence detector configured to sense one or more of a presence and absence of a user, the presence detector being coupled to a controller to effect sanitation of the fluid bowl with the sanitation module upon detection of the one or more of the presence and the absence of the user.

* * * * *